March 14, 1961

W. L. VERVEST ET AL 2,974,981

ARRESTER FOR IRON PARTICLES

Filed June 26, 1957

INVENTOR.
WILHELMUS LAMBERTUS VERVEST
GODFRIED HENDRIK WAARLÉ

BY

AGENT

United States Patent Office 2,974,981
Patented Mar. 14, 1961

2,974,981

ARRESTER FOR IRON PARTICLES

Wilhelmus Lambertus Vervest and Godfried Hendrik Waarle, both of Hilversum, Netherlands, assignors to North American Philips Company, Inc., New York, N.Y., a corporation of Delaware Filed June 26, 1957, Ser. No. 668,152

Claims priority, application Netherlands July 14, 1956

1 Claim. (Cl. 286—1)

The invention relates to closure means for iron particles consisting of an annular magnet between the wall of a space containing the iron particles and a shaft taken through this wall and rotatable relative to this wall.

Such arresting means are important for example for such clutches in which iron powder in a liquid or without a liquid is capable of establishing the coupling by means of a magnetic field. In this case one clutch portion usually consists of a drum filled with iron powder, the other portion of a shaft inserted in the drum and journalled in the drum preferably by means of roller bearings. The bearings should, in this case, be protected from penetrating iron powder.

It is known with iron-powder clutches to provide an arrester which consists of an annular permanent magnet arranged in the wall and magnetized in an axial direction and provided with two rings of soft iron, which surround the shaft at a small distance. The magnetic circuit formed by the permanent magnet and the two rings is closed across the shaft. Iron particles in the proximity of this arrester will be drawn between the shaft and the soft-iron rings, so that an accumulation of iron particles will be formed at this area. Owing to the rotation of the shaft relative to the soft-iron rings this accumulation gives rise to wear and frictional losses with slip clutches.

In accordance with the invention at least two annular magnets are arranged coaxially at a small distance from one another with the identical poles facing one another, one magnet being arranged in the wall, the other on the shaft, surrounding the same.

By means of the positions and the direction of magnetization of the magnets it is ensured that the maximum concentration of the magnetic field does not lie in the space between the magnets, but exactly at the boundary thereof. Consequently an iron particle located in the space is thrust out of this space, so that the structure according to the invention reduces the wear and the frictional losses.

In a preferred embodiment of the invention the magnets lie side by side and are magnetized in an axial direction.

The invention will now be described more fully with reference to one embodiment.

Figure 1:
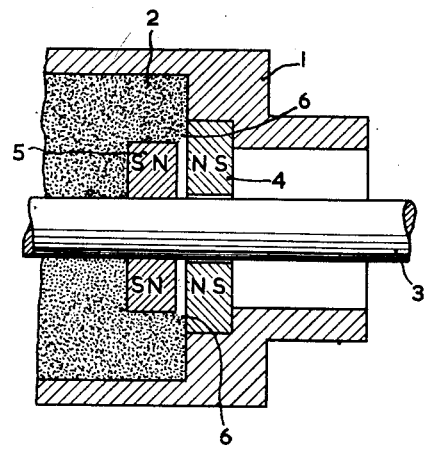
Figure 2:
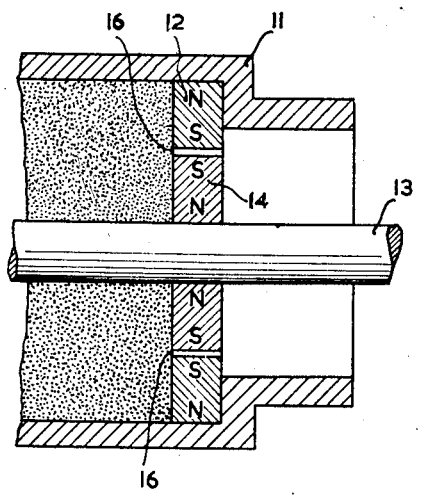

Fig. 1 is a sectional view of an arrester consisting of two adjacent permanent magnets and Fig. 2 shows an arrester consisting of two permanent magnets arranged coaxially.

Fig. 1 shows a portion of a wall 1 of a drum containing iron powder 2; through this wall is taken a shaft 3, which is rotatable relative to the wall 1. The wall 1 comprises an annular, permanent magnet 4, which is magnetized in an axial direction. The shaft 3 is surrounded by a second permanent magnet 5, which is located at the side of the permanent magnet 4 at a small distance therefrom; the North poles of the two magnets face one another. The maximum concentration of the magnetic lines of force lies approximately on the surface 6, so that any iron particles between the magnets 4 and 5 are moved towards the surface 6.

Referring to Fig. 2, a wall 11 has a permanent magnet 12 and a shaft 13 is surrounded by a permanent magnet 14. The magnetisation direction of the two magnets is radial and the South poles of the two magnets are facing one another. In the space between the magnets operates a highly concentrated field, the concentration of which is at a maximum at the surface 16. Therefore, iron particles which have penetrated between the magnets will be moved towards the surface 16.

For the construction according to the invention use may be made with advantage of a permanent magnetic material, which is commercially available under the tradename of "ferroxdure," which is described in U.S. Patent No. 2,762,777, issued September 11, 1956 to J. J. Went et al., since this material maintains its magnetism for a very long time.

What is claimed is:

A closure device for iron particles in a magnetic drive construction comprising a drum having said iron particles therein, a shaft extending through a wall of said drum and rotatable relative to said wall, a first annular permanent magnet fixed to said wall, a second annular permanent magnet surrounding said shaft, said annular permanent magnets being spaced and positioned co-axially in side-by-side relationship with identical poles thereof facing each other whereby any iron particles attempting to gain access to the space between the annular permanent magnets are repelled.

References Cited in the file of this patent

UNITED STATES PATENTS 2,718,946    Winther _____ Sept. 27, 1955

FOREIGN PATENTS 513,030    Italy _____ Feb. 3, 1955